United States Patent [19]

Bianco

[11] Patent Number: 5,042,419

[45] Date of Patent: Aug. 27, 1991

[54] PORTABLE SIGNALLING DEVICE

[76] Inventor: Joel C. Bianco, 12530 Cinema, St. Louis, Mo. 63127

[21] Appl. No.: 458,773

[22] Filed: Dec. 29, 1989

[51] Int. Cl.[5] .............................................. G01D 21/00

[52] U.S. Cl. .................................... 116/209; 116/174; 116/173; 40/218; 40/586; 40/610

[58] Field of Search ............... 116/209, 210, 174, 173, 116/281, 283, 63 P; 24/596, 602, 603; 248/188.5, 295.1, 298, 407, 423; 40/218, 571, 586, 601, 610

[56] References Cited

U.S. PATENT DOCUMENTS

| | | | |
|---|---|---|---|
| 815,155 | 3/1906 | Pax et al. | |
| 1,288,060 | 12/1918 | Leduc | 116/173 |
| 1,305,885 | 6/1919 | Coe | |
| 1,312,426 | 8/1919 | Schmidt | |
| 1,484,485 | 2/1924 | Frear | |
| 1,616,584 | 2/1927 | Lawley | |
| 1,632,639 | 6/1927 | Weise | 248/188.5 X |
| 2,418,549 | 4/1947 | de Rugeris | 9/9 |
| 2,458,316 | 1/1949 | Swertlow | 287/58 |
| 3,797,450 | 3/1974 | Frisbee | 116/28 |
| 4,467,947 | 8/1984 | Minneman | 206/3 |
| 4,727,822 | 3/1988 | Wikkerink | 116/174 |
| 4,800,834 | 1/1989 | Feng | 116/172 |

FOREIGN PATENT DOCUMENTS

| | | | |
|---|---|---|---|
| 36239 | 7/1952 | Poland | 116/209 |

*Primary Examiner*—Thomas B. Will
*Assistant Examiner*—James K. Folker
*Attorney, Agent, or Firm*—Rogers, Howell & Haferkamp

[57] ABSTRACT

A portable signalling device is disclosed. The device comprises a housing having a longitudinal opening therein, a signal support slidably engaged in the longitudinal opening between a contracted position and an expanded position, and a clip on the housing. The signal support is capable of displaying a signal when the signal support is in the expanded condition. The clip is adjustable from a closed position, which secures the signal support in the contracted position and provides a slot suitable as a belt loop for securing the device on a belt or strap, to an open position allowing movement of the signal support to its expanded position and removal of the device from a closed belt or strap inserted through the slot.

6 Claims, 2 Drawing Sheets

FIG. 2.
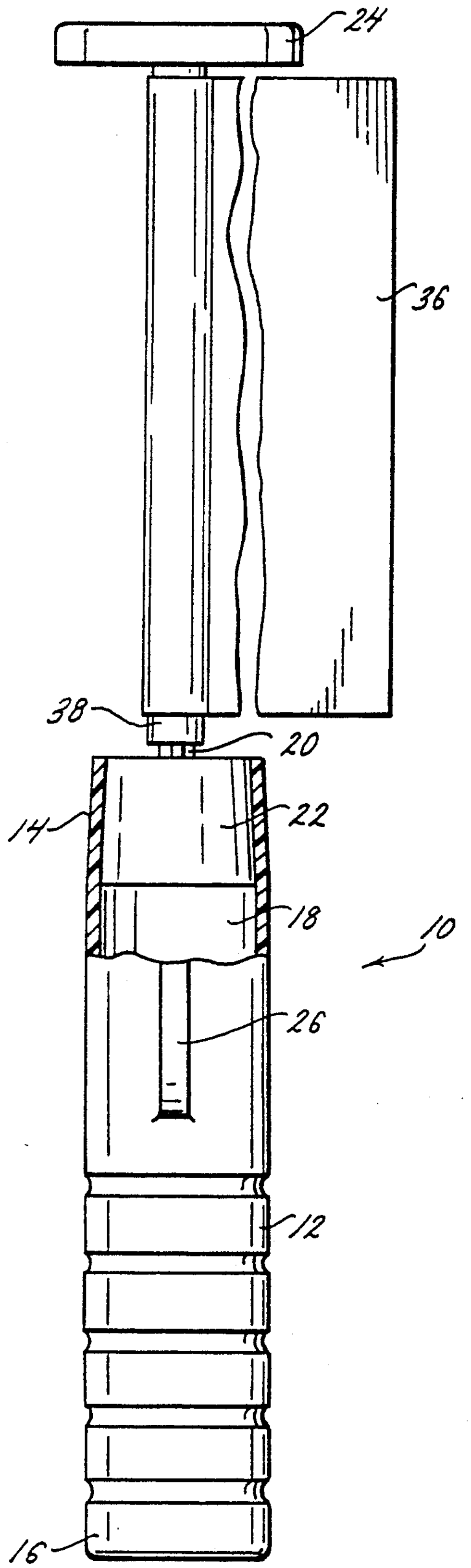
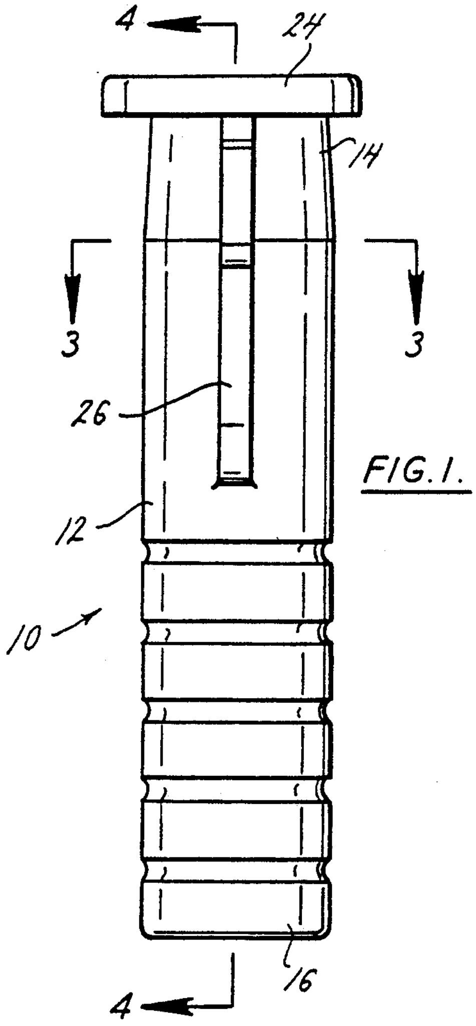
FIG. 1.
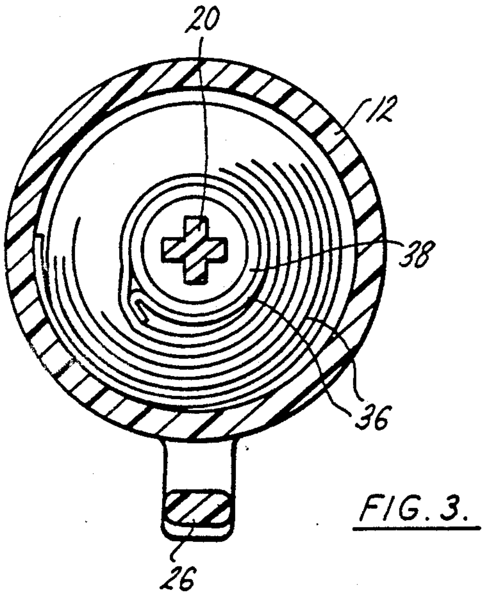
FIG. 3.

PORTABLE SIGNALLING DEVICE

BACKGROUND OF THE INVENTION

1. Field of the Invention

The present invention relates to signalling devices, and more particularly to portable devices that can be expanded to display a signal to aid in locating someone carrying the device.

2. Description of the Prior Art

In the course of many activities, especially sporting activities such as boating, water skiing or snow skiing, participants sometimes find themselves in distress situations in which it is difficult to locate them to provide aid. Thus, it is beneficial for such participants to carry devices which provide a highly visible signal, facilitating location of the participant when in distress. For example, water skiers often wear brightly colored vests that are easily seen while the skier is in the water.

However, such conventional devices suffer from several drawbacks. Life vests are difficult to see because they are largely submerged in the water when the wearer is in distress. In non-water related activities, wearing of a particular article of clothing for high visibility may be impractical or may be difficult to see when the wearer is in distress. For example, snow may cover or obstruct the view of the jacket of a snow skier. Moreover, wearing apparel is difficult to move quickly to aid in attracting attention.

Hand held signalling devices can be raised, such as above the snow or water level, and waved for high visibility, but such devices would involve other disadvantages. For example, holding the device leaves only one hand free. Mechanisms used for attaching other types of devices are available, but while use of such typical mechanisms to attach the device to the carrier may free the wearer's hand, such mechanisms suffer from other disadvantages.

Often such mechanisms comprise either a loop on the device to be held or a clip, such as a pen clip, which secures the device to a belt by pinching the belt. Devices with loops, however, require extra hardware anchored to the belt to removably accept the loop, or do not allow removal without opening the belt. Clips allow the device to accidentally fall off or be knocked from the belt.

The device may be secured by a cord that links the holder to a belt or strap of the carrier, but this would involve other problems. Thus, when in distress, the carrier first must locate the holder dangling from the end of the cord. If the cord is short, facilitating location of the flag holder, the carrier must also detach the cord from the carrier's belt or strap so that the flag holder may be held away from the belt or strap. Typically, the flag holder would be held over the carrier's head to signal for aid. On the other hand, if the cord is long enough to avoid the necessity of detaching it from the belt or strap, it is difficult to locate, especially in an emergency situation, and may tend to become entangled. Moreover, if a long cord is used, it may tend to get in the way of enjoyment of the carrier's activity when not in distress.

In addition, the carrier must take the extra steps of opening the flag holder and unfurling the flag before signalling for help. These several steps can be difficult as well as dangerous in the high-pressure emergency situations in which such devices frequently are used.

Accordingly, a device is still needed that can be carried by a person, yet allows both hands to remain free, that can be located quickly in an emergency and that can be raised quickly for signalling when the carrier is in distress.

SUMMARY OF THE INVENTION

Briefly, therefore, the present invention is directed to a novel portable signalling device. The device comprises a housing having a longitudinal opening therein, a signal support slidably engaged in the longitudinal opening between a contracted position and an expanded position, and a clip on the housing. The signal support is capable of displaying a signal when the signal support is in the expanded condition. The clip is adjustable from a closed position, which secures the signal support in the contracted position and provides a slot suitable as a belt loop for securing the device on a belt, to an open position allowing movement of the signal support to its expanded position and removal of the device from a closed belt inserted through the slot.

Among the several advantages found to be achieved by the present invention, therefore, may be noted the provision of a portable signalling device that can be carried on one's person yet leaves both of the carrier's hands free; the provision of such device that can be located quickly in an emergency; the provision of such device that can be hand held for signalling by waving the hand, but also attaches to a belt or strap directly and without additional hardware or a length of cord linking the device to the belt or strap; and the provision of such device which can be retrieved and removed from the carrier's belt or strap, opened to display a signal and waved without requiring an undue number of steps.

BRIEF DESCRIPTION OF THE DRAWINGS

FIG. 1 is a side elevation view of the portable signalling device of this invention in a contracted position;

FIG. 2 is a partially cut-away side elevation view of the device in an expanded position;

FIG. 3 is a cross-sectional view of the device taken along line 3—3 of FIG. 1;

Corresponding reference characters indicate corresponding parts throughout the several views of the drawings.

DESCRIPTION OF THE PREFERRED EMBODIMENTS

Figure 4:
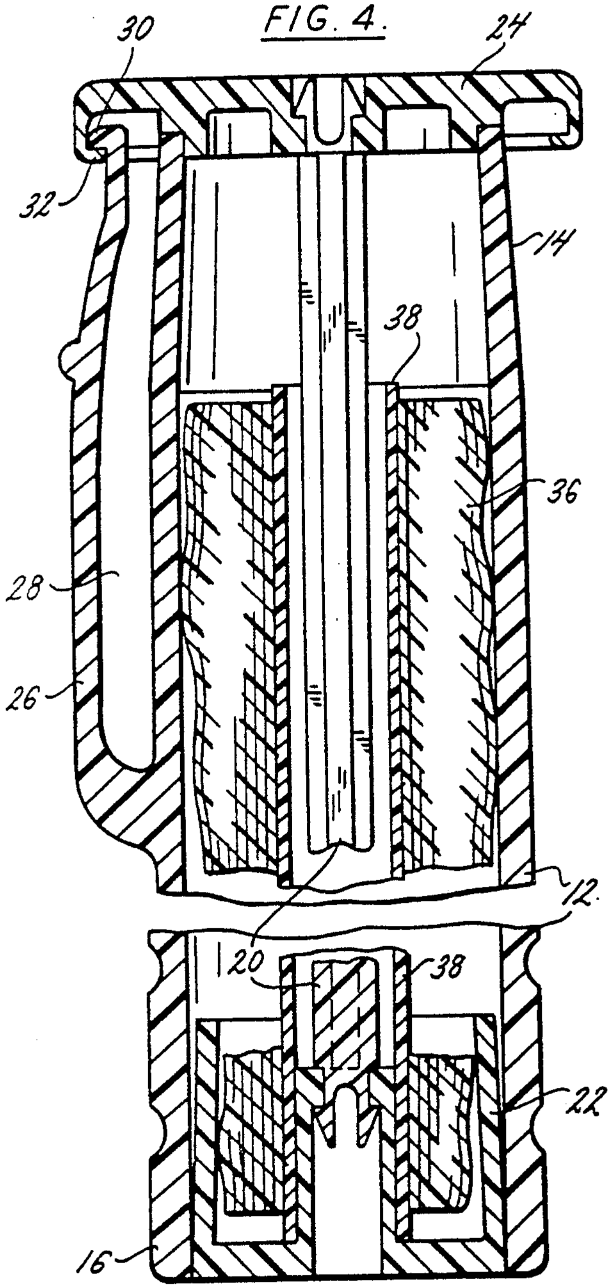
FIG. 4 is a segmented cross-sectional view of the device taken along line 4—4 of FIG. 1.

Referring now to FIG. 1 of the drawings, there is generally indicated at 10 a portable signalling device of this invention. The signalling device 10 comprises a housing 12 having top and bottom ends 14 and 16, respectively, and a longitudinal opening 18 extending inwardly from the top end 14 (shown in part in FIG. 2). Preferably, the housing 12 is generally tubular in shape, with the bottom end 16 either open or closed, as desired. In other words, opening 18 may extend the entire length of the housing 12 to form a longitudinal hole, or it may extend only partway toward the bottom end 16.

Referring now to FIGS. 2, 3 and 4, it will be seen that within and extending from the opening 18 of the housing 12 is a signal support comprising a shaft 20 extending longitudinally from a base 22 to a cap 24. The signal support is slidably engaged in the opening to permit movement between a contracted position of the signal support in which the signal support is mostly contained within the opening 18 as shown in FIG. 1 and an expanded position in which most of the signal support and in particular, the shaft 20 thereof, extends outwardly of the opening 18 as shown in FIG. 2.

A stop means is provided to avoid accidentally withdrawing the signal support completely from the opening 18 when the signal support is adjusted to the expanded position. The stop means may comprise for example, an inwardly extending shoulder at the top end 14 of the housing 12 or a tapered portion at the top end 14. The taper would provide the opening 18 with a decreased diameter at the top end 14.

The base 22 may likewise be provided with a taper so that, when the signal support is drawn to the expanded position, the base 22 may engage the tapered portion of opening 18 in the manner of a wedge to prevent unintentional slippage of the signal support back to the contracted position. The cap 24 may be sized to prevent the signal support from sliding too far into the opening 18, which might render the signal support unaccessible and so impede withdrawal.

As best seen in FIG. 4, a clip 26 on the housing 12 provides a slot 28 between the clip and the housing for accommodating a belt or strap therethrough. In addition, the clip 26 secures the cap 24 to retain the signal support in the contracted position. In one embodiment, as shown in FIG. 4, the clip 26 has one end that is anchored to the housing 12 and a free end that has a tab 30 extending therefrom. The tab interlocks with an inwardly extending lip 32 of the cap 24. When it is desired to open the device 10 to the expanded position, the free end of the clip 26 is deflected inwardly to release the cap 24. The signal support may then be pulled to the expanded position. Release of pressure from the clip 26 then provides the slot 28 with an open end by which the device 10 may be removed from the belt or strap. Thus, the clip not only holds the device directly on and secures it directly to the belt, yet allows quick and easy removal when desired, but also releases the cap of the device in the same step, allowing the device to be converted to the expanded position.

Figure 5:
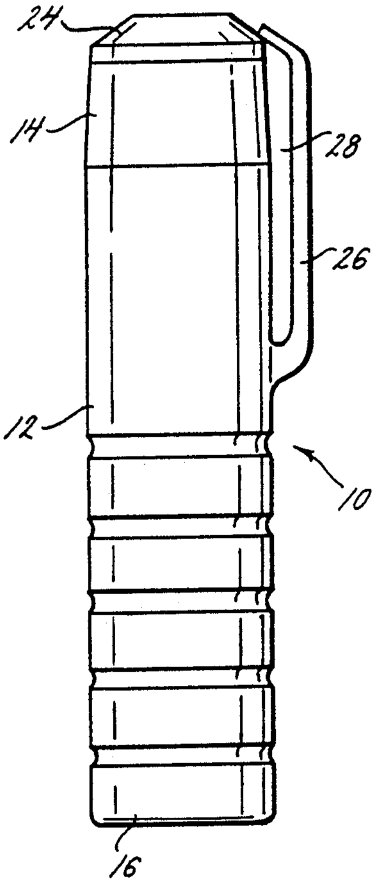
FIG. 5 is a side elevational view of a second embodiment of the device.

In a second embodiment, as shown in FIG. 5, the free end of the clip 26 is angled inwardly to cover a portion of the cap 24 when the signal support is in the contracted position. In this embodiment, the device may be removed from the carrier's belt or strap simply by pulling on the device, causing the clip 26 to deflect outwardly and simultaneously releasing the cap 24 from retention by the clip 24.

Figure 6:
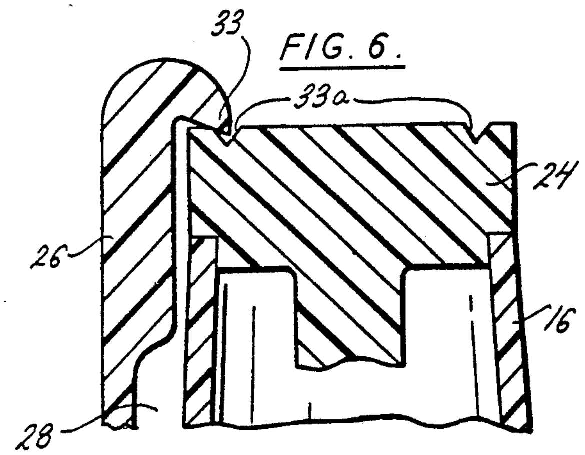
FIG. 6 is a cross-sectional view of the top end of a third embodiment of the device.

In another embodiment, as illustrated in FIG. 6, the free end of the clip 26 curves over an edge of the cap 24. A tab 33 extending from the free end of the clip 26 is received in a groove 33*a* in the top of cap 24. This arrangement allows the clip 26 to "click" into the groove 33*a* to hold the clip securely to the cap such that the clip resists inadvertent tugs or pulls which might otherwise open the slot 28, allowing the device to fall from a belt. Nevertheless, when removal from the belt is desired, a short downward yank can remove the device from the belt.

Figure 7:
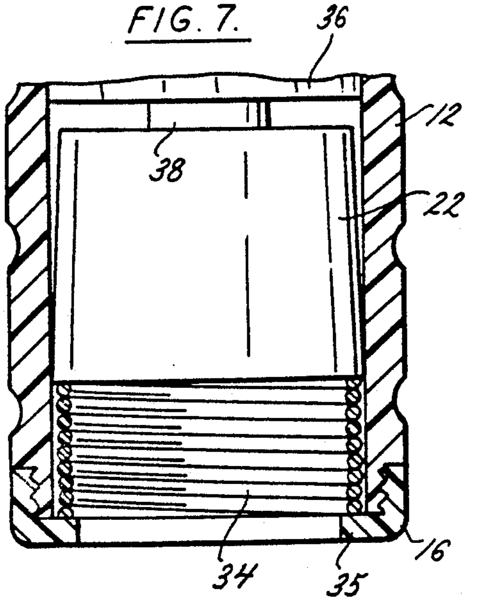
FIG. 7 is a cross-sectional view of the bottom end of a fourth embodiment of the device.

Optionally, as shown in FIG. 7, a biasing means may be included in the device to urge the signal support to the expanded position. This embodiment may be used in combination with any of the features of the embodiments discussed above. According to this embodiment, merely deflecting the clip 26 to release the cap 24 causes the signal support to extend automatically to the expanded position. As shown in FIG. 6, the biasing means may be a spring 34 located within the opening 18 between the base 22 of the signal support and the bottom end 16 of the housing 12. The spring 34 may be biased against the base 22, for example, by a shoulder 35 extending inwardly at the bottom end 16 or, if the opening 18 does not extend completely through the housing 12, by the closed end of the opening 18.

A signal such as a flag 36 is affixed to the signal support such that the signal is displayed when the signal support is in the expanded position. If the signal is a flag, a tube 38 may be rotatably positioned about the shaft 20 and a side of the flag affixed longitudinally along the tube 38 as shown in FIG. 2. The flag may be wrapped around the tube and shaft for storage in the housing when the signal support is in the contracted position. Surprisingly, it has been found that if the tube 38 is freely rotatable about the shaft 20, merely waving the device in a back and forth motion when the signal support is in the expanded position automatically unfurls the flag. Thus, an extra, cumbersome unwrapping step is obviated.

If desired, the device may be designed to float, thereby limiting the risk of losing the device when used in water. One or more techniques may be employed in the floatable design. For example, an air-tight cap may be applied to the bottom end of the device. When dropped in water, the weight of the flag and staff tends to pull the unsealed end of the device downward, thereby creating an air pocket in the device causing the device to float. Low density plastics or floatation agents within the device might be employed.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed:

1. A portable signalling device comprising:

a housing having a longitudinal opening therein;

a signal support slidably engaged in said longitudinal opening between a contracted position and an expanded position, the signal support having a base end which is retained at least partially inside of the housing when the signal support is in its expanded position, a shaft extending from the base end to the cap end and a tube rotatable about the shaft, the signal support being capable of displaying a flag when the signal support is in the expanded condition, a side of the flag being affixed longitudinally to the tube, the flag being wrapped about the tube when the signal support is in its contracted position and the tube being freely rotatable about the shaft, so that when said signal support is extended to its expanded position, waving the device in a back and forth motion unfurls said flag; and a clip on said housing, the clip being adjustable from a closed position, in which the signal support is secured in the contracted position and a slot suitable as a belt loop for securing the device on a belt or strap is provided, to an open position allowing movement of the signal support to its expanded position and removal of the device from a closed belt or strap inserted through the slot, the clip having two ends, one of which is anchored to the housing, the other end having a tab thereon to engage said cap end by engaging a groove in said cap end thereby to releasably secure the signal support in its contracted position.

2. A portable signalling device as set forth in claim 1, wherein the longitudinal opening is tapered at one end, preventing complete removal of the signal support from the housing and maintaining the signal support in its expanded position.

3. A portable signalling device as set forth in claim 2, further comprising a biasing means urging said signal support to its expanded position.

4. A portable signalling device as set forth in claim 3, wherein said clip, said cap end, said signal support and said biasing means are arranged such that when the device is attached to a belt or strap positioned through the slot, pulling of the device can open said clip, allowing the device to be removed from the belt or strap and automatically to expand the signal support to its expanded position and waving the device in a back and forth motion unfurls the flag.

5. A portable signalling device comprising:

a housing having a longitudinal opening therein;

a support slidably engaged in said longitudinal opening between a contracted position and an expanded position, said signal support being capable of displaying a signal when the signal support is in the expanded condition; and a clip on said housing, the clip being adjustable from a closed position, in which the signal support is secured in the contracted position and a slot as a belt loop is provided for securing the device on a belt or strap such that the weight of the device and normal activity of a wearer does not tend to cause unintended opening of the clip or removal of the device from the belt or strap, to an open position allowing both movement of the signal support to its expanded position and removal of the device from a closed belt or strap inserted through the slot, the clip being adjustable from the closed to the open position when a belt or strap extends through the slot thereof simply by a single pull of the device.

6. A portable signalling device comprising:

a housing having a longitudinal opening therein;

a signal support slidably engaged in said longitudinal opening between a contracted position and an extended position, the signal support being capable of displaying a flag when the signal support is in the expanded condition; and a clip on said housing, the clip being adjustable from a closed position, in which the signal support is secured in the contracted position and a slot suitable as a belt loop for securing the device on a belt or strap is provided, to an open position allowing movement of the signal support to its expanded position and removal of the device from a closed belt or strap inserted through the slot, said clip and said signal support being arranged such that when the device is attached to a belt or strap positioned through the slot, pulling of the device can open said clip, allowing the device to be removed from the belt or strap and automatically to expand the signal support to its expanded position.

* * * * *